W. T. HOOFNAGLE.
METHOD AND APPARATUS FOR MAKING OZONE.
APPLICATION FILED APR. 23, 1915.
1,169,825.
Patented Feb. 1, 1916.
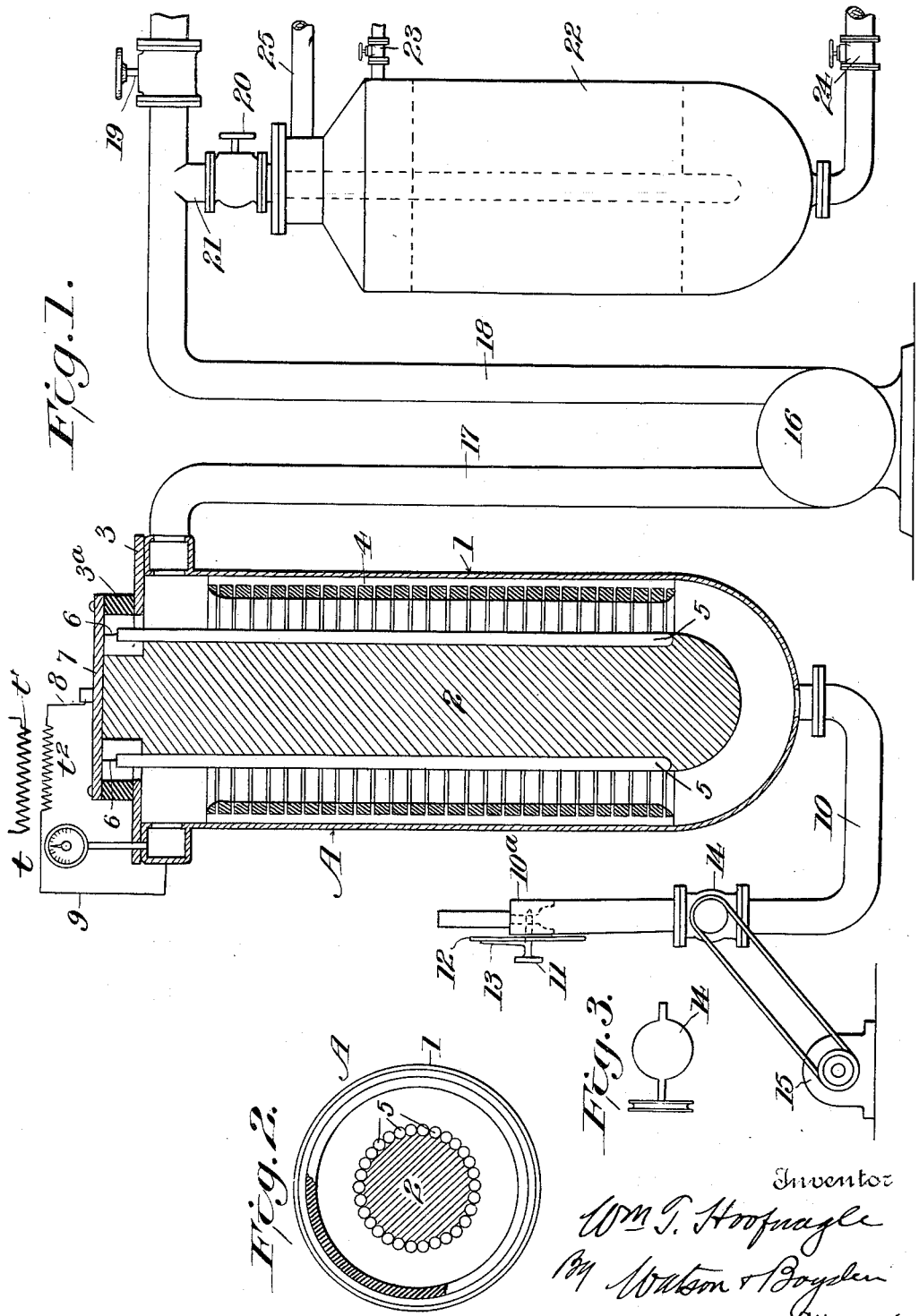

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

METHOD AND APPARATUS FOR MAKING OZONE.

1,169,825.　　　　　Specification of Letters Patent.　　Patented Feb. 1, 1916.

Application filed April 23, 1915. Serial No. 23,342.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Methods and Apparatus for Making Ozone, of which the following is a specification.

This invention relates to improvements in apparatus for producing ozone.

In treating air electrically, either for the production of ozone, or for the recovery of nitrogen from the air, I have found it very advantageous to treat the air in a rarefied condition, as the chemical effect is much greater at low air pressure than at atmospheric pressure, and also, a better electrical field is produced, with less energy, in a partial vacuum than at atmospheric pressure. The advantages of this method of treatment are set forth in patents previously granted to me. For recovering nitrogen from the air, it is of advantage to treat the rarefied air in a quiescent state; but I have found that with a similar air treating apparatus, if means is provided for causing rapid vibration or surging of the air within the reaction chamber, ozone is produced at a very rapid rate.

The present invention comprises means for drawing air, in a rarefied state, through a reaction chamber, wherein it is electrically treated, and means for causing rapid vibration or surging of the air under treatment to facilitate the production of ozone.

In the accompanying drawing, Figure 1 is a side elevation of an apparatus, illustrating the invention, the reaction chamber being shown in vertical section; Fig. 2 is a cross-section through the reaction chamber; and, Fig. 3 is a detail view of the valve for causing vibration of the air.

Referring to the drawing, A indicates a reaction chamber, more particularly described in my co-pending application Serial No. 23,341, filed April 23, 1915, and comprising an outer cylindrical metal shell 1, having therein a central core 2 of insulating material, the latter suspended from a cover plate 3, of like material. Within the shell 1, and electrically connected to it, is a cylindrical electrode 4, and surrounding the core 2 are glass tubes 5, arranged in circular series and containing a conducting liquid which forms the inner electrode. The conducting liquid in the tubes is connected by conductors 6 to a metal cap plate 7, which rests upon a collar $3^a$, of insulating material, projecting from the cover 3. The secondary coil $t^2$ of a transformer $t$ has its ends connected to the cap plate 7, and the shell 1, by conductors 8 and 9, respectively, and it will be evident that when an alternating current is flowing through the primary coil $t'$ of the transformer, a high tension current from the secondary coil will flow through the space in the reaction chamber intervening between the electrode on the shell and the electrode on the core. An air pipe 10 leads into the lower end of the reaction chamber, and the end $10^a$ of said pipe has an opening, restricted by an adjustable valve 11, through which air may enter the pipe and pass into the reaction chamber. A dial 12 is arranged adjacent the valve and is graduated to indicate the flow of air, in cubic feet, into the apparatus, a pointer 13, movable with the valve stem, being provided for coöperation with the dial. Arranged in the intake pipe 10 is a rotatable valve 14, driven by a suitable motor 15. This valve may be a butterfly valve, as shown in Fig. 3. An exhaust pump 16 is connected by a pipe 17 to the upper end of the reaction chamber, and an outlet pipe 18 leads from the pump to the point where the ozone is to be utilized. As shown for the purpose of illustration, a valve 19 is arranged in this pipe so that the ozonized products may be led through the pipe to a room, where, for instance, it may be desired to purify the air, and if this valve be closed and a valve 20 in a branch pipe 21 be opened, the ozone may be led into a vessel, indicated at 22, for the purpose of sterilizing water. This vessel, in the drawing, is shown with an inlet pipe 23 and an outlet pipe 24, for the water, and another outlet pipe 25 for the gases may pass through the water.

In operation, the pump continuously draws air through the reaction chamber, the degree of rarefaction being controlled by the adjustable valve 11, which restricts the intake opening in the pipe. The current is supplied through the transformer $t$, and the rapid rotation of the valve 14 by the motor 15 causes a checking and release of the air which results in rapid oscillation or surging of the air as it flows through the electrical field in the reaction chamber, the effect being the formation of ozone which is carried out by the pump to the point of use.

What I claim is:

1. The method of making ozone which comprises drawing air through a reaction chamber, rapidly checking and releasing the flow to cause surging of the air while passing through the chamber, and passing an electric current through the air therein.

2. The method of making ozone which comprises passing air through a reaction chamber, causing rapid expansion and compression of the air while passing through the chamber, and passing an electric current through the air therein.

3. The method of making ozone which comprises drawing air in a rarefied state through a reaction chamber, rapidly checking and releasing the flow to cause surging of the air while passing through the chamber, and passing an electric current through the air therein.

4. In an apparatus for making ozone, a reaction chamber having inlet and outlet openings, means for passing a current of air through said chamber, means for rapidly checking and releasing the flow to cause surging of the air within the chamber and means for passing an electric current through the air in the chamber.

5. In an apparatus for making ozone, a reaction chamber having inlet and outlet pipes, means for passing a current of air through said chamber and pipes, means in one of said pipes for causing surging of the air, and means for passing an electric current through the air in the chamber.

6. In an apparatus for making ozone, a reaction chamber having inlet and outlet openings, means for drawing air through the chamber, means for rapidly checking and releasing the air current to cause surging of the air in the chamber, and means for passing an electric current through the air in the chamber.

7. In an apparatus for making ozone, a reaction chamber having an intake pipe, means for drawing air through said pipe and chamber, a valve in said pipe, means for rotating said valve, and means for passing an electric current through the air in the chamber.

8. In an apparatus for making ozone, a reaction chamber having an intake pipe, means for drawing air through said pipe and chamber, means for restricting the flow of air through said pipe, a valve in said pipe, means for rotating said valve, and means for passing an electric current through the air in the chamber.

In testimony whereof I have affixed my signature.

WILLIAM T. HOOFNAGLE.